(12) United States Patent
Cox (10) Patent No.: US 12,122,198 B2
(45) Date of Patent: Oct. 22, 2024

(54) RAPID-DEFLATE VALVE STEM COVER AND ASSOCIATED SYSTEMS AND METHODS

(71) Applicant: CHRISTOPHER COX CREATIVE, Park City, UT (US)

(72) Inventor: Christopher Paul Cox, Park City, UT (US)

(73) Assignee: Christopher Cox Creative, Park City, UT (US)

( * ) Notice: Subject to any disclaimer, the term of this patent is extended or adjusted under 35 U.S.C. 154(b) by 0 days.

(21) Appl. No.: 17/979,723

(22) Filed: Nov. 2, 2022

(65) Prior Publication Data

US 2024/0142013 A1    May 2, 2024

(51) Int. Cl.
| | |
|---|---|
| *F16K 24/04* | (2006.01) |
| *B60C 29/06* | (2006.01) |
| *F16K 15/20* | (2006.01) |
| *F16K 27/12* | (2006.01) |

(52) U.S. Cl.
CPC .......... *B60C 29/066* (2013.01); *B60C 29/068* (2013.01); *F16K 15/20* (2013.01); *F16K 24/04* (2013.01); *F16K 27/12* (2013.01)

(58) Field of Classification Search
CPC ........ F16K 15/20; F16K 24/04; F16K 15/202; F16K 15/205; F16K 15/207; F16K 27/12; B60C 29/06; B60C 29/066; B60C 29/068
USPC ......................................... 137/230, 233, 234
See application file for complete search history.

(56) References Cited

U.S. PATENT DOCUMENTS

| | | | | |
|---|---|---|---|---|
| 1,082,232 A | * | 12/1913 | Nielsen ................... | F16K 15/20 137/523 |
| 1,291,401 A | * | 1/1919 | Caven ..................... | B65D 90/22 220/88.1 |
| 1,313,554 A | * | 8/1919 | Nielsen ................... | F16K 15/20 29/451 |
| 1,408,959 A | * | 3/1922 | Royer ..................... | B60C 29/06 137/234 |
| 1,772,107 A | * | 8/1930 | Nels ........................ | F16K 15/20 137/469 |
| 2,228,359 A | * | 1/1941 | McIlrath ................. | F16K 24/04 137/637 |
| 2,458,999 A | * | 1/1949 | Mills ....................... | E03F 1/007 123/179.9 |

(Continued)

*Primary Examiner* — Kevin F Murphy
*Assistant Examiner* — Jonathan J Waddy
(74) *Attorney, Agent, or Firm* — Christensen O'Connor Johnson Kindness PLLC (57) ABSTRACT

A valve assembly for controlling inflation and deflation is provided. The valve assembly includes a rapid-deflate valve cover having a central passage extending through the annular body; an internally threaded portion positioned within the central passage configured to threadingly interface with an externally threaded portion of a valve stem; and a pressure relief formed in the internally threaded portion. The rapid-deflate valve cover can include a valve core positioned within the central passage near the proximal end and configured to selectively permit gas flow from the proximal end into the central passage past the valve core. When the rapid-deflate valve cover is in a closed position, the annular body contacts the valve stem to prohibit gas flow through the central passage. When the rapid-deflate valve cover is in the open position, the body is positioned away from the valve stem to permit gas flow into the central passage.

17 Claims, 8 Drawing Sheets

(56) References Cited

U.S. PATENT DOCUMENTS

| | | | | |
|---|---|---|---|---|
| 2,812,000 | A * | 11/1957 | Trinca | B60C 29/06 |
| | | | | 251/293 |
| 2,967,508 | A * | 1/1961 | Hovorka | G01L 17/00 |
| | | | | 116/34 R |
| 3,994,312 | A * | 11/1976 | Tanner | F16K 15/207 |
| | | | | 73/146.8 |
| 5,564,584 | A * | 10/1996 | Raboin | F17C 13/06 |
| | | | | 220/DIG. 16 |
| 9,533,534 | B2 * | 1/2017 | Lamgaday | B60C 23/123 |
| 2011/0114644 | A1 * | 5/2011 | Willey | F16L 55/1152 |
| | | | | 220/203.07 |
| 2017/0043630 | A1 * | 2/2017 | Lin | B60C 29/02 |
| 2017/0144494 | A1 * | 5/2017 | Jochumsen | B60C 29/068 |
| 2017/0361667 | A1 * | 12/2017 | Foor | F16K 15/026 |
| 2021/0402835 | A1 * | 12/2021 | Cox | B60C 29/005 |

* cited by examiner

RAPID-DEFLATE VALVE STEM COVER AND ASSOCIATED SYSTEMS AND METHODS

BACKGROUND

Inflatable tires are typically inflated by transferring gas (e.g., air, nitrogen, etc.) through a valve and into the pressure chamber of the tire. The valve has a valve stem that contains a check system (e.g., a valve core) that can open to permit the stem to receive gas during inflation and can close to retain gas within the pressure chamber at a specified gas pressure level depending on the materials, specification, temperature, intended application, etc. of the tire. The check system of the valve can be a self-contained valve core positioned within the valve stem and configured to operably open to receive gas during inflation or expel gas during deflation of the tire. The valve core check system is typically biased to a closed position by the pressure in the inner chamber and/or a biasing spring to prevent gas from escaping the tire.

Valves are commonly used on automobile, motorcycle, and bicycle tires, but can also be used in other applications, such as machinery, carts, tools, etc. Some common conventional valve designs include a Schrader valve, an American valve, a Presta valve, a Dunlop valve, and others. Certain valve designs are standardized such that universal inflation/deflation tools and/or pressure gauges can be used with the port or interface to inflate and/or deflate the tire mounted on a wheel. In some configurations, tire pressure monitoring systems (TPMS) can be integrated with the valve such that a computer of the vehicle can remotely monitor the pressure within the pressure chamber of the tire.

In some off-road situations with bumpy and/or rocky terrain, a lower gas pressure than would be used in on-road conditions can increase compliance of the tire and improve traction. When a lower gas pressure is desired, a vehicle operator can manually deflate each tire to the desired pressure for optimal traction and performance. Deflation using some conventional valve designs requires opening the valve core by translating a core needle inward to release gas from the pressure chamber of the tire. The core needle can be translated by an object, a tool, etc., and the pressure can be monitored with a gauge at intervals during deflation until the desired pressure chamber pressure is reached. This process requires continuous force by the object or tool to overcome the bias of the needle (e.g., the spring bias) during deflation. Further, conventional valve cores generally have small gas flow passageways relative to the valve stem opening, which causes the deflation process to be tedious and time-consuming.

DETAILED DESCRIPTION

The following disclosure describes various embodiments of rapid-deflate valve stem covers and associated systems and components for use with valves of pressure chambers, e.g., valves of inflatable tires. In some embodiments, rapid-deflate valve stem covers configured in accordance with the present disclosure include high-flowrate deflation configurations to release gas from the pressure chamber and thereby lower the pressure within the pressure chamber relatively quickly compared to conventional valves. The rapid-deflate valve stem covers can be configured to interface with the wheel of the vehicle through a standardized valve stem form factor, e.g., a Schrader valve stem form factor, so that the rapid-deflate valve stem covers can be installed without modification to the wheel and/or the valve stem. Embodiments of the rapid-deflate valve stem covers of the present disclosure can be compatible with TPMS remote sending units.

In some situations, such as use during use of a vehicle in off-road terrain, it may be desirable to deflate the tires to a lower pressure than the standard pressures for on-road use. Conventional valves are not configured for rapid-deflation of the tire. By way of an example, a vehicle tire inflated to on-road operating pressures (e.g., 30-50 PSI) can take up to 15 minutes to deflate to pressures suitable for off-road use (e.g., under 20 PSI). In this regard, the rapid-deflate valve stem covers of the present disclosure provide faster deflation than deflation using conventional valves. In some embodiments, the rapid-deflate valve stems of the present disclosure are capable of releasing gas within the pressure chamber of the tire at about ten times faster, or greater, than releasing gas using conventional valves.

The rapid-deflate valve stem covers of the present disclosure can be configured for high gas flow rate during deflation of a tire with a standardized form factor (e.g., a Schrader valve form factor) for compatibility with inflation and pressure measuring components (e.g., filling nozzles, pressure gauge interfaces, etc.). In some embodiments, a pressure gage can be operably coupled to the valve stem cover and remain in place while moving the valve stem between open and closed positions. Embodiments of the rapid-deflate valve stem cover and other systems of the present disclosure are suitable for use with any pressure chamber having a valve stem interface.

Certain details are set forth in the following description and in FIGS. 1A-4C to provide a thorough understanding of various embodiments of the present disclosure. In other instances, well-known structures, systems, materials and/or operations often associated with valve stems and associated components are not shown or described in detail in the following disclosure to avoid unnecessarily obscuring the description of the various embodiments of the disclosure. Those of ordinary skill in the art will recognize, however, that embodiments of the present disclosure can be practiced without one or more of the details set forth herein, or with other structures, methods, components, and so forth. The terminology used below is to be interpreted in its broadest reasonable manner, even though it is being used in conjunction with a detailed description of certain examples of embodiments of the present disclosure. Indeed, certain terms may even be emphasized below; however, any terminology intended to be interpreted in any restricted manner will be overtly and specifically defined as such in this Detailed Description section.

The accompanying Figures depict embodiments of the present disclosure and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present disclosure. Those of ordinary skill in the art will also appreciate that further embodiments of the invention can be practiced without several of the details described below. In the Figures, identical reference numbers identify identical, or at least generally similar, elements.

Figure 1A:
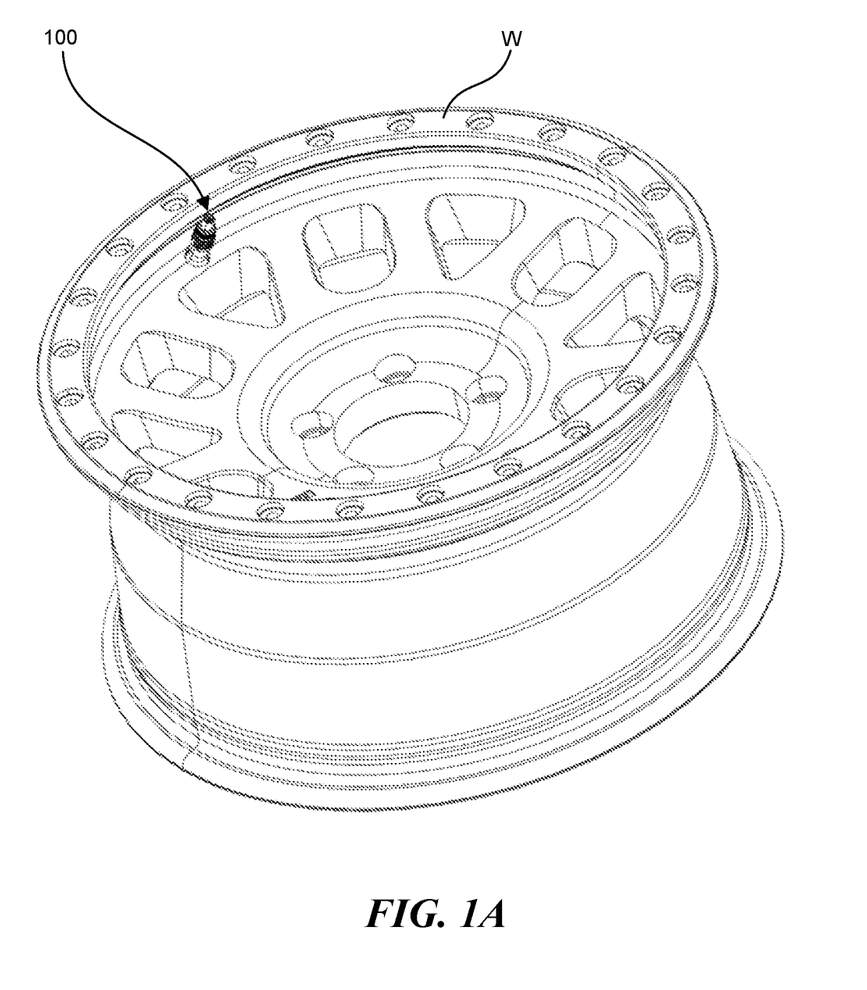
FIGS. 1A-1C are environmental perspective, enlarged detail, and cross-sectional views, respectively, showing a wheel with a valve stem assembly having a valve stem and a rapid-deflate valve stem cover configured in accordance with embodiments of the present disclosure.
Figure 1B:
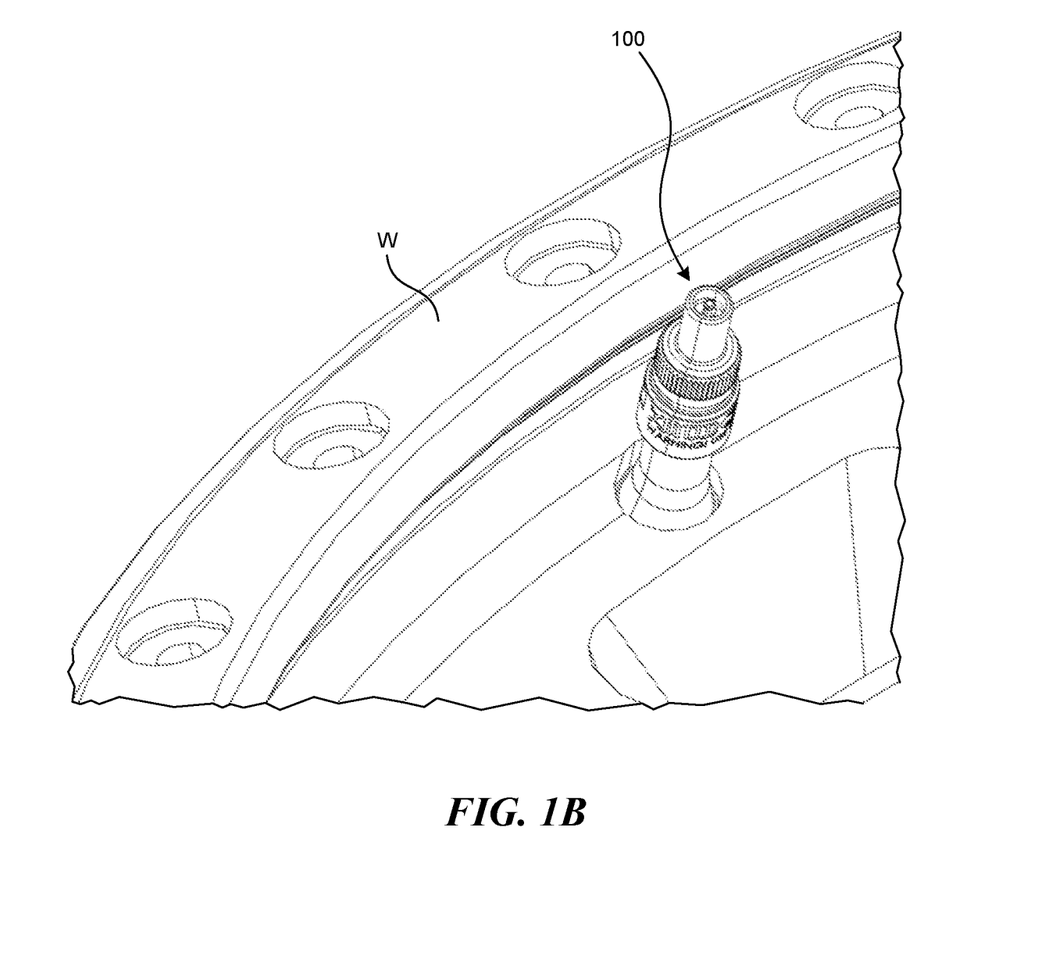
Figure 1C:
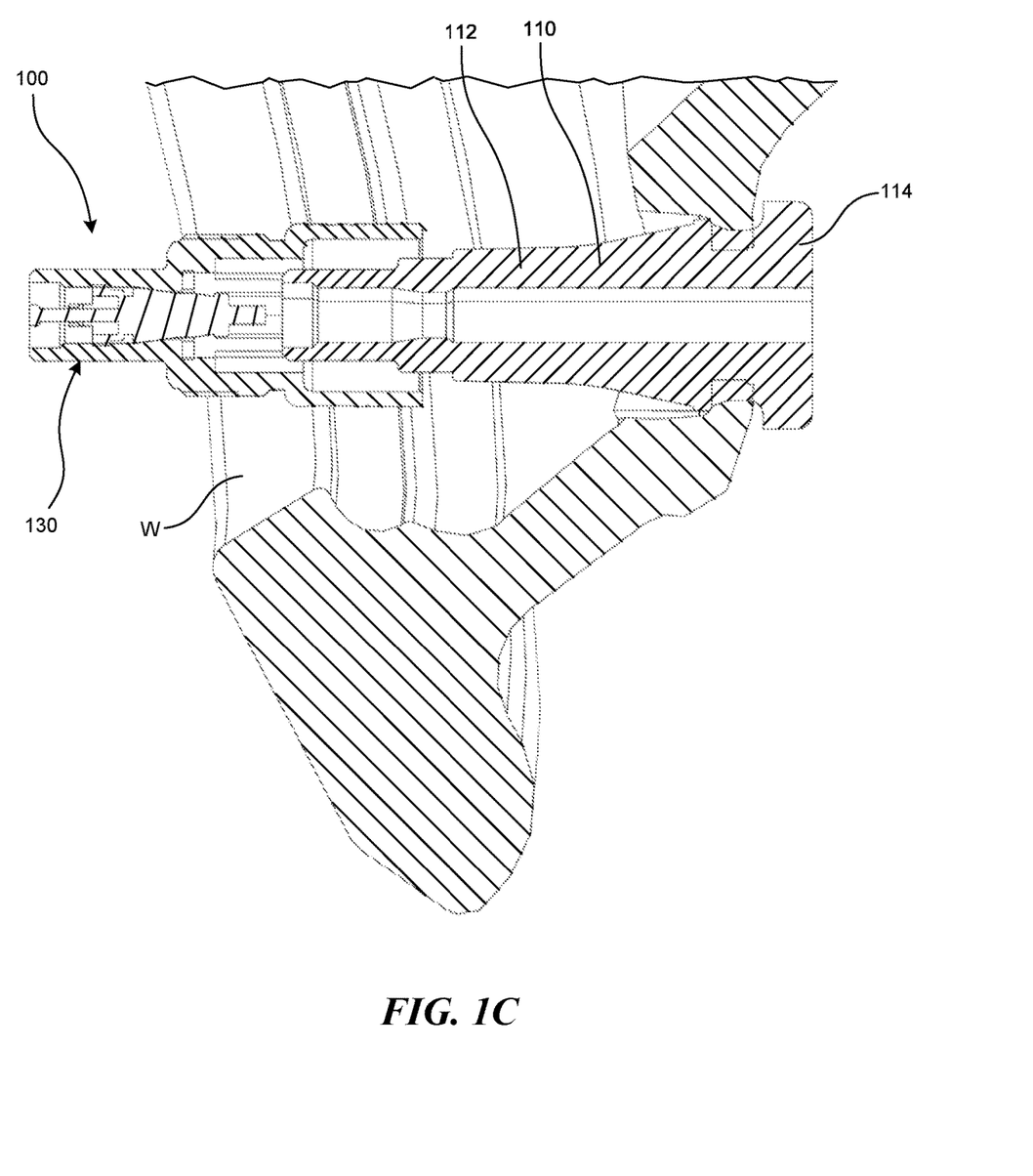
Figure 2:
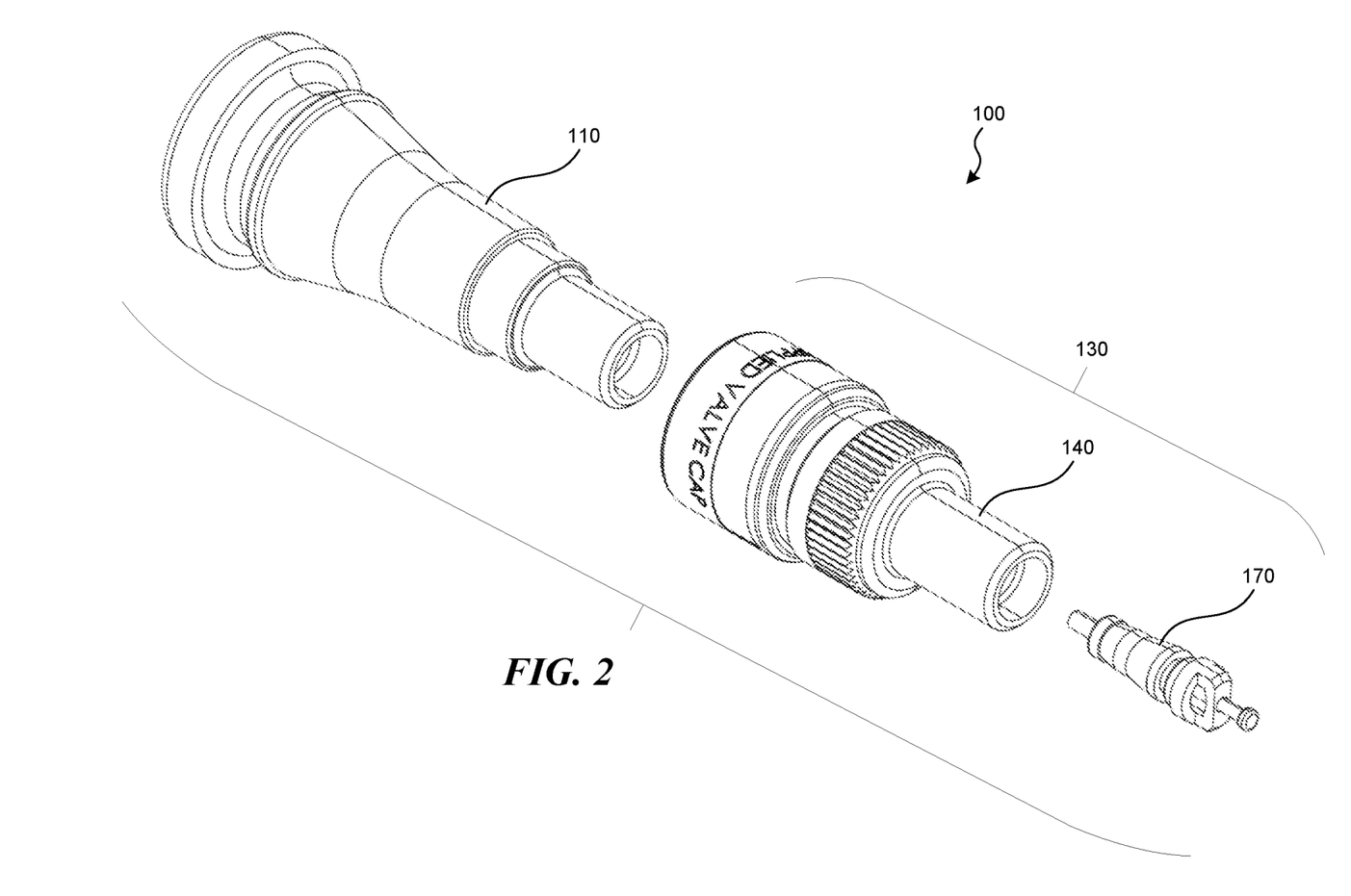
FIG. 2 is an exploded view of the valve stem assembly of FIGS. 1A-1D.

FIGS. 1A-1C are environmental perspective, enlarged detail, and cross-sectional views, respectively, showing a valve assembly 100 ("assembly 100") having a valve stem 110 and a rapid-deflate valve stem cover assembly 130 ("cover assembly 130"), and FIG. 2 is an exploded view of the assembly 100, each configured in accordance with embodiments of the present technology. In the illustrated views of FIGS. 1A-1C, the assembly 100 can be configured for use with a vehicle wheel W in place of a conventional inflation/deflation valve stem (e.g., a conventional Schrader valve assembly, a Presta valve assembly, etc.). The assembly 100 includes features for rapid deflation of the gas within the pressure chamber of a tire (not shown). The assembly 100 includes the valve stem 110 that may be mounted to the wheel W such that an outer portion 112 of the valve stem 110 extends exterior to the pressure surfaces of the wheel W and an inner portion 114 of the valve stem 110 extends interior to the pressure surfaces of the wheel W (see FIG. 1C). The assembly 100 also includes the cover assembly 130 removably couplable to the outer portion 112 of the valve stem 110. The cover assembly 130 can have a valve core 170 to selectively restrict the flow of gas through the assembly 100. Embodiments of the assembly 100 may be configured for use with any gas exchange system.

Figure 3A:
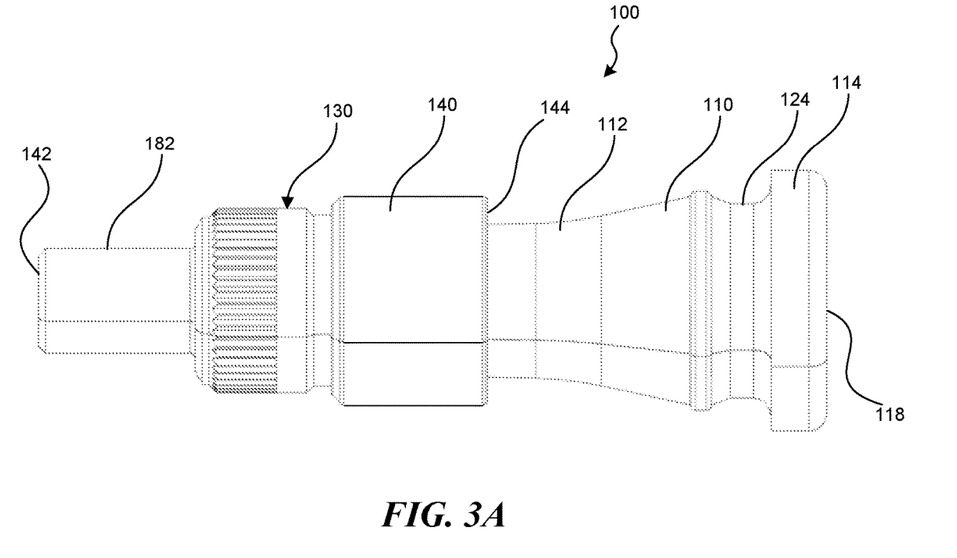
FIGS. 3A and 3B are side and side cross-sectional views, respectively, of the valve stem assembly of FIGS. 1A-2, with a rapid-deflate valve stem cover assembly shown in a closed position.
Figure 3B:
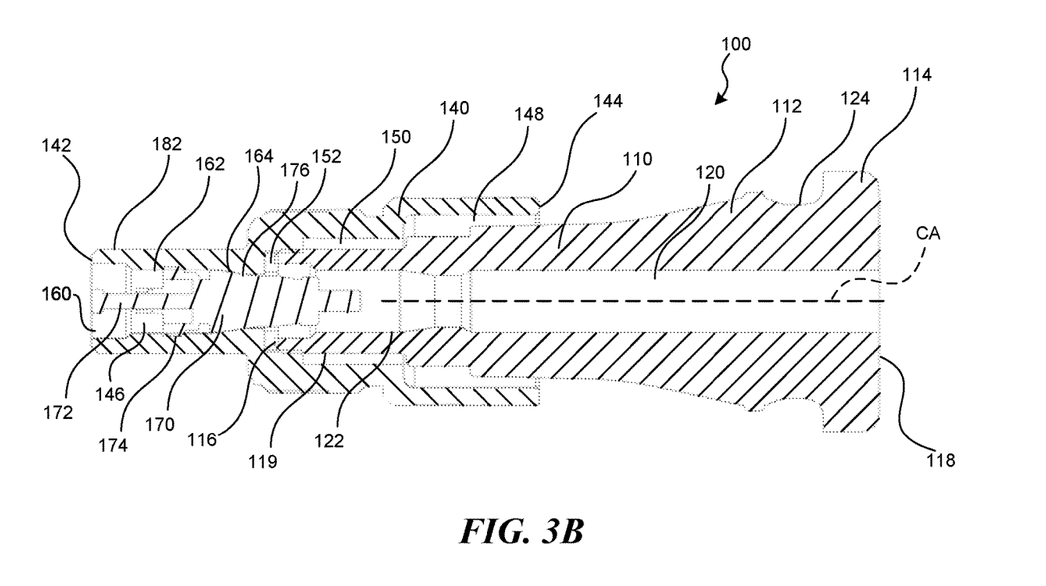

FIGS. 3A and 3B are side and side cross-sectional views, respectively, of the assembly 100, with the cover assembly 130 shown in a closed position, which will be described in greater detail below. In some embodiments, the valve stem 110 of the assembly 100 is a valve stem of a conventional Schrader valve assembly (not shown). In these embodiments, the valve stem 110 has a notch 124 configured to interface with a bore in the wheel W to operably couple the valve stem 110 to the wheel W. The valve stem 110 has a proximal end 116 that includes an externally threaded portion 119 and has a distal end 118. In configurations of valve stems for conventional Schrader valve assemblies, the externally threaded portion 119 can be configured to operably receive an optional dust cap (not shown) by engaging internal threads (not shown) of the dust cap with the externally threaded portion 150. The dust cap can enclose the proximal end 116, preventing ingress of dust, dirt, liquid, and other contaminants, particularly as the vehicle travels in off-road conditions. Removing the dust cap from a conventional Schrader valve assembly exposes a portion of a valve core (not shown) configured to selectively allow gas into and out of the pressure vessel of the tire. The valve stem 110 further includes a central bore 120 defining a central axis CA and having an internally threaded portion 122 (FIG. 3B) configured to threadingly couple the conventionally positioned valve core (when inserted in the conventional Schrader valve configuration) within the central bore 120. In these conventional configurations, a core needle (not shown) of the valve core can be translated to permit gas flow in either direction through the central bore 120.

Embodiments of the assembly 100 of the present disclosure omit the valve core within the valve stem 110 and the optional dust cap of a conventional Schrader valve assembly. In this regard, the dust cap and valve core can be removed from the valve stem 110 to open the central bore 120 and permit gas flow through the valve stem 110. With the valve core and the dust cap of the conventional Schrader valve assembly removed (e.g., the valve stem 110 as shown in FIG. 2), the valve stem 110 is configured to receive the cover assembly 130, forming the assembly 100 of the present disclosure.

As shown in FIGS. 3A and 3B, the cover assembly 130 has an annular body 140 ("body 140") with a proximal end 142 and a distal end 144. The body 140 includes a central passage 146 generally aligned with the central axis CA and having various features configured to permit gas flow into and out of the valve stem 110. The central passage 146 can have an enlarged exhaust bore 148 proximal to the distal end of the body 140. The diameter of the exhaust bore 148 can be greater than a diameter of the externally threaded portion 119 and at least a portion of the outer portion 112 of the valve stem 110. The central passage 146 can include an internally threaded portion 150 positioned proximate to the exhaust bore 148 and configured to engage the externally threaded portion 119 to operably couple the cover assembly 130 to the valve stem 110. A seal 152 can be positioned proximate to the internally threaded portion 150 and configured to interface with the proximal end 116 of the valve stem 110 to prevent gas from flowing through the central bore 120 of the valve stem 110 and out of the exhaust bore 148 when the cover assembly 130 is in a closed position—threaded onto the valve stem 110 such that the proximal end 116 and the seal 152 are in contact with each other. In some embodiments, the seal is an o-ring, a washer, a sealing material, etc. In other embodiments, a sealing material can be applied within the central passage 146 that is configured to sealingly interface with the proximal end 116 of the valve stem 110.

The central passage 146 of the body 140 further includes a valve core chamber 160 at the proximal end 142. The valve core chamber 160 has an internally threaded portion 162 and a tapered sealing portion 164. The valve core chamber 160 can be configured to receive a valve core 170 therein, by engaging threads 174 of the valve core 170 with the internally threaded portion 162 and abutting a tapered sealing surface 176 of the valve core 170 against the tapered sealing portion 164 of the valve core chamber 160. (See FIG. 3B.) The valve core 170 can be any suitable valve core, e.g., a Schrader valve core, etc.

The cover assembly 130 can further include an externally threaded portion 182 (see FIGS. 3A and 3B) configured to receive a dust cap (not shown) such as a conventional Schrader valve dust cap removed from the valve core 110 to operably couple the cover assembly 130 thereto.

Figure 4A:
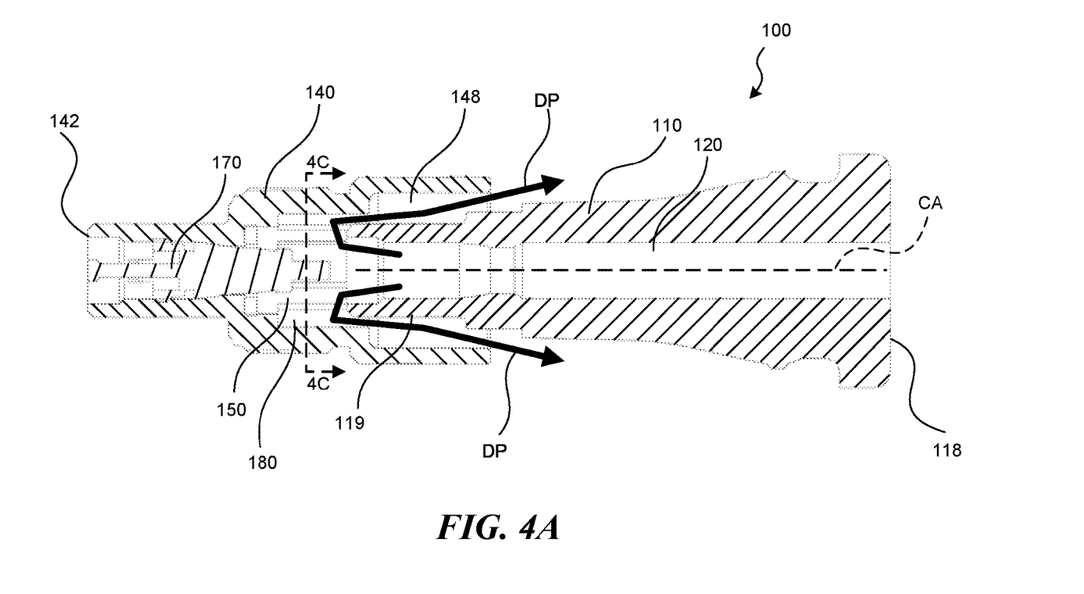
FIG. 4A is a side cross-sectional view of the valve stem assembly of FIGS. 1A-2, with the rapid-deflate valve stem cover assembly shown in an open position, and showing a representative deflation path of the gas flow from a pressure chamber within the tire.
Figure 4B:
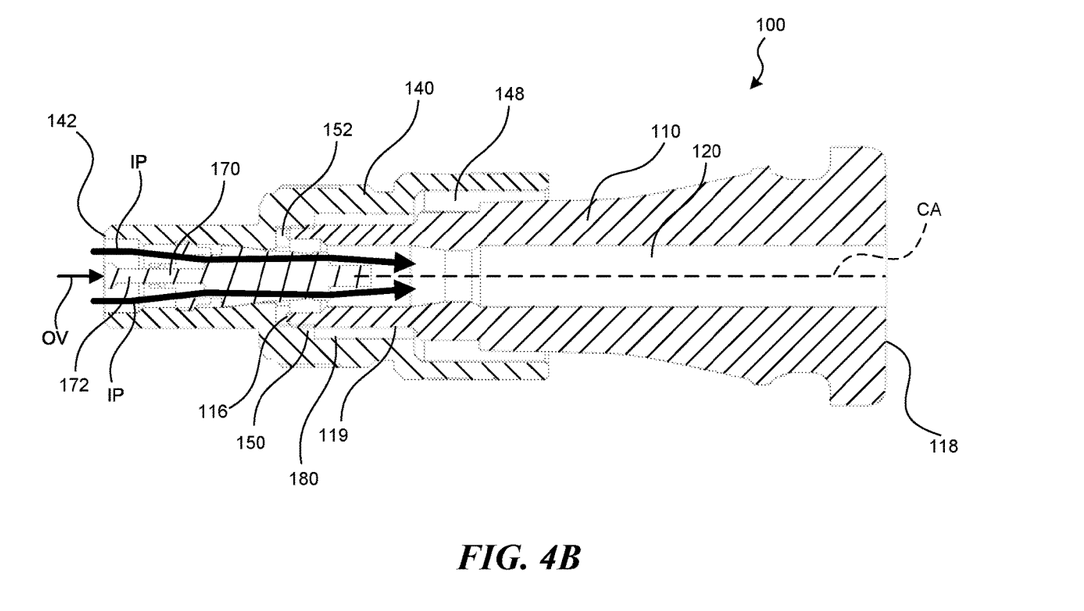
FIG. 4B is a side cross-sectional view of the valve stem assembly of FIGS. 1A-2, with the rapid-deflate valve stem cover assembly shown in the closed position, and showing a representative inflation path of the gas flow into the pressure chamber within the tire.

FIGS. 4A and 4B are cross-sectional views of the assembly 100 shown in an open position (FIG. 4A) and a closed position (FIG. 4B). Unthreading the cover assembly 130 from the valve stem 110 moves the assembly 100 to the open position which allows escape of gas from the pressure chamber of the tire, deflating the tire. Threading the cover assembly 130 onto the valve stem 110 to a position where the proximal end 116 contacts the seal 152 moves the assembly 100 to the closed position in which gas is retained within the pressure chamber of the tire, or gas selectively flows through the valve core 170 (e.g., to inflate or deflate the tire).

As shown in FIG. 4A, the cover assembly 130 can be rotated to separate the proximal end 116 of the valve stem 110 and the seal 152. As the internally threaded portion 150 of the cover assembly 130 rotates with respect to the externally threaded portion 119 of the valve stem 110, the cover assembly 130 moves away from the valve stem 110, opening deflation paths DP to allow rapid deflation of gas from the pressure chamber of the tire (e.g., when airing down tires for off-road handling, etc.) In this regard, gas flows from the pressure chamber of the tire, and follows the deflation paths DP through the central bore 120, into pressure relief troughs 180 formed in the internally threaded portion 150 of the cover assembly 130, and through the exhaust bore 148 to exhaust to the atmosphere. In other embodiments, the pressure relief troughs 180 can be a gap, a keyway, a scallop, an aperture, or any other suitable opening for pressure relief of the gas within the pressure chamber of the tire.

Figure 4C:
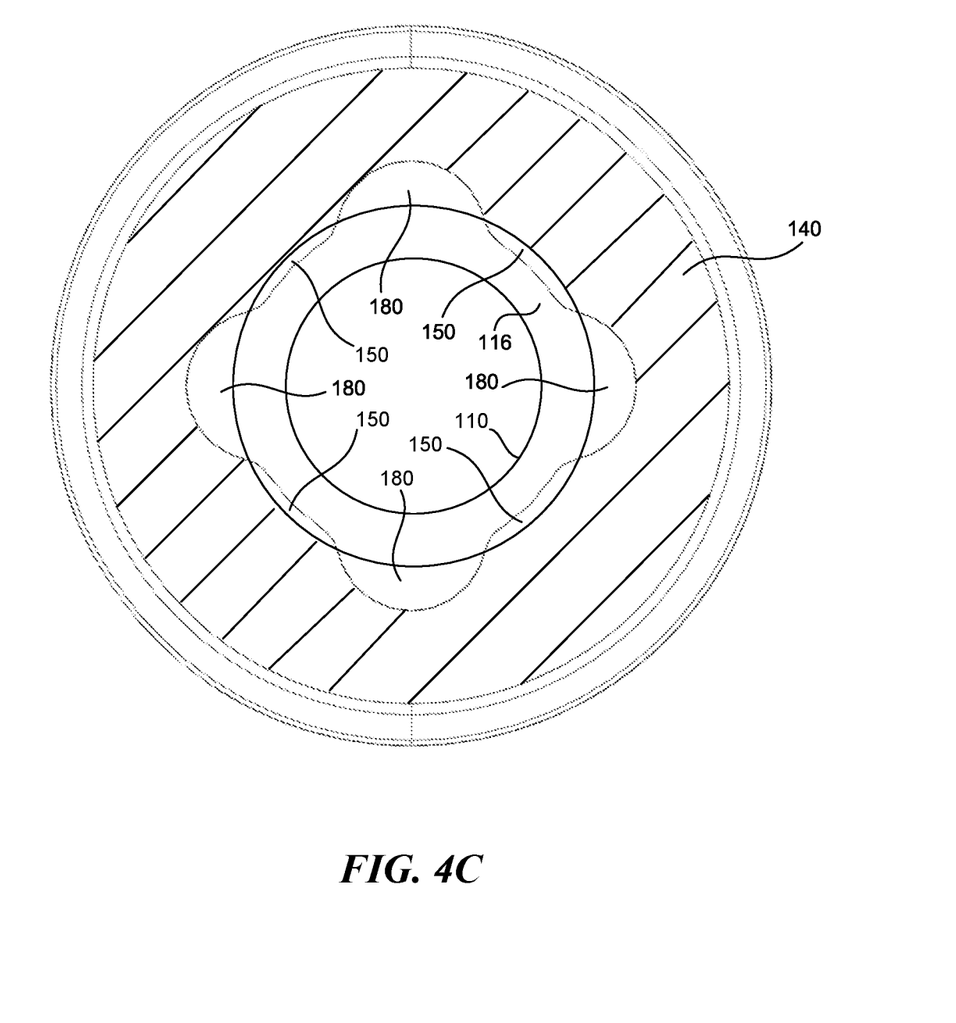
FIG. 4C is a cross-sectional view of the valve stem assembly of FIGS. 1A-2 taken along section line 4C-4C of FIG. 4A, and shown with a valve core hidden.

FIG. 4C is a cross-sectional view of the assembly 100 taken along section line 4C-4C of FIG. 4A, and showing the valve stem 110 and the body 140 at the interface of the externally threaded portion 119 and the internally threaded portion 150. As shown, the pressure relief troughs 180 form a gas flow path past the threads of the externally threaded portion 119 and the internally threaded portion 150 such that gas can flow from the central bore 120, through the pressure relief troughs 180, and into the exhaust bore 148. The pressure relief troughs 180 allow for rapid deflation of the pressure chamber of the tire without fully removing the cover assembly 130 from the valve stem 110. In use, if the cover assembly 130 was fully removed from the valve stem 110, the target tire pressure could be missed, resulting in a lower pressure than desired and requiring inflation of the tire prior to use. In one example, approximately 3 to 5 rotations of the cover assembly 130 with respect to the valve stem 110 will result in maximum gas flow along the deflation path DP. In other examples, approximately 4 or greater rotations of the cover assembly 130 with respect to the valve stem 110 will result in maximum gas flow along the deflation path DP. It will be appreciated that any suitable thread pitch can be used for the threads of the externally threaded portion 119 and the internally threaded portion 150, and changes in the thread pitches can result in a differing numbers of rotations of the cover to gain maximum gas flow along the deflation path DP. Although the illustrated embodiment shows four arcuate pressure relief troughs 180, any number and shape of pressure relief troughs is within the scope of the present disclosure. The pressure relief troughs 180 have an area defined by the open area between the body 140 and the valve stem 110, as shown in FIG. 4C. In this regard, the area of the pressure relief troughs 180 can be the minimum gas flow area along the deflation path DP, and therefore define the maximum flowrate of the gas from the pressure chamber of the tire to the atmosphere.

In embodiments of the present disclosure, the area of the pressure relief troughs 180 along all of the deflation paths DP is significantly larger than the area of the internal passageways of a conventional Schrader valve core, providing a rapid deflation rate relative to conventional Schrader valve deflation rates when translating the core needle. In some embodiments, the assembly 100 has a deflation rate from about 4 to 10 times greater compared to average conventional Schrader valve deflation rates. In other embodiments, the assembly 100 has a deflation rate from about 5 to 8 times greater compared to average conventional Schrader valve deflation rates Once the pressure chamber of the tire has been deflated to a desired gas pressure, the cover assembly 130 can be rethreaded onto the valve stem 110 such that the proximal end 116 contacts the seal 152, positioning the assembly 100 in the closed position shown in FIG. 4B. In the closed position, gas is not permitted to flow along the path shown in FIG. 4A, and instead the flow of gas can be controlled by the valve core 170 in a similar manner to a conventional Schrader valve. In this regard, the pressure chamber of the tire can be inflated with a suitable inflation tool (e.g., an air nozzle, etc.) by engaging the inflation tool with the proximal end 142, thereby translating a core needle 172 in the open valve direction OV such that the valve core 170 permits gas flow through the central passage 146 and along the inflation paths IP into the central bore 120.

Figure 5:
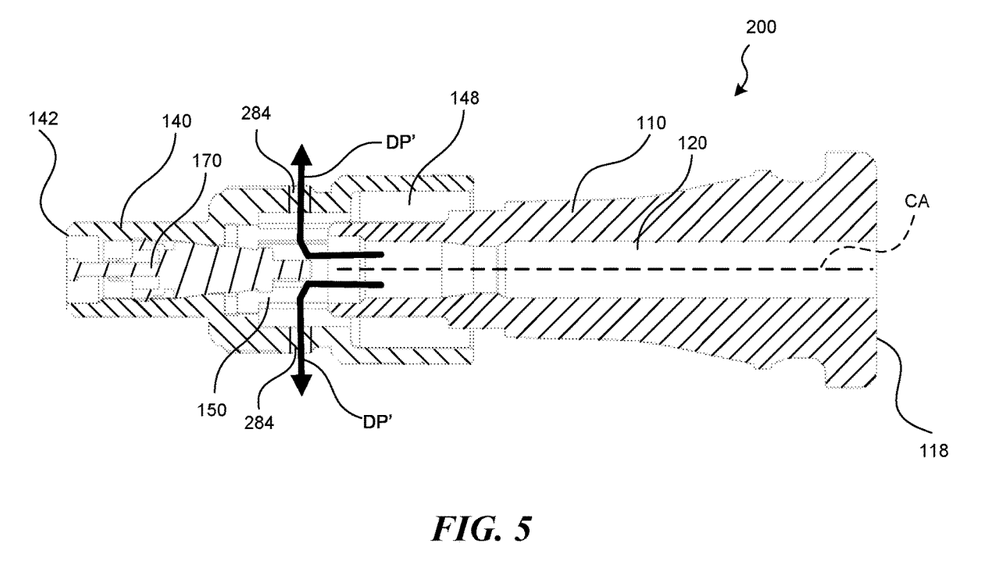
FIG. 5 is a cross-sectional view of a valve stem assembly having a valve stem and a rapid-deflate valve stem cover configured in accordance with further embodiments of the present disclosure.

FIG. 5 is a cross-sectional view of showing a valve assembly 200 ("assembly 200") in accordance with another embodiment of the present disclosure. The components and function of the assembly 200 are substantially similar to the assembly 100, except that the pressure relief troughs 180 are omitted and instead the assembly 200 includes pressure relief orifices 284 extending radially through a body 240 of a rapid-deflate cover assembly 230. As shown in FIG. 5, the pressure relief orifices modify the deflation path DP of FIG. 4A such that the gas flows along deflation path DP' and radially outward through the pressure relief orifices 284 (assembly 200) instead of the exhaust bore 148 (assembly 100). Although the pressure relief orifices 284 are shown in cross-section in FIG. 5, any number of pressure relief orifices 284 are within the scope of the present disclosure. Further embodiments of the assembly 200 can include pressure relief orifices 284 located at different axial positions relative to the central axis CA (e.g., "staggered" relative to the other pressure relief orifices 284).

Although embodiments are shown for use with an automotive wheel and tire configuration for purposes of the present disclosure, the valve assemblies and rapid-deflate valve cover assemblies described herein can be used with any suitable type of gas system, e.g., wheels and tires on other types of vehicles, other gas valve uses, gas-filled suspension components, etc. Accordingly, the various embodiments of the present technology described herein are not limited to use with a particular configuration.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., gas, air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A rapid-deflate valve cover assembly, comprising:
an annular body defining a central axis and having a proximal end and a distal end, the annular body including:
a central passage extending through the annular body along the central axis from the proximal end to the distal end;
an internally threaded portion positioned within the central passage, the internally threaded portion configured to threadingly engage an externally threaded portion of a valve stem;
a seal positioned within the central passage proximate to the internally threaded portion; and
a pressure relief opening including a longitudinal trough formed in a direction of the central axis along the internally threaded portion; and
a valve core positioned within the central passage near the proximal end and configured to selectively permit gas flow from the proximal end into the central passage past the valve core,
wherein:
when the rapid-deflate valve cover assembly is in a closed position, the seal contacts the valve stem to prohibit gas flow from the valve stem into the central passage and out of the pressure relief opening, and the valve core is at least partially received within the valve stem, and
when the rapid-deflate valve cover assembly is in an open position with the internally threaded portion partially threadingly engaged with the externally threaded portion of the valve stem, the seal is positioned away from the valve stem to permit gas flow from the valve stem through the pressure relief opening.

2. The rapid-deflate valve cover assembly of claim 1, wherein the central passage of the annular body further comprises an exhaust bore proximal to the distal end of the annular body.

3. The rapid-deflate valve cover assembly of claim 2, wherein the exhaust bore has a bore diameter greater than an external diameter of a portion of the valve stem to form a gas flow path external to the valve stem and axially out of the distal end of the annular body.

4. The rapid-deflate valve cover assembly of claim 2, wherein the internally threaded portion is positioned within the central passage between the seal and the exhaust bore, and wherein, when in the open position, a portion of the exhaust bore extends past the externally threaded portion in a direction along the central axis toward the distal end.

5. The rapid-deflate valve cover assembly of claim 1, wherein the pressure relief opening further includes an orifice extending through the annular body to form a gas flow path radially away from the internally threaded portion.

6. The rapid-deflate valve cover assembly of claim 1, wherein the seal is selected from the group consisting of an o-ring, a washer, and a sealing material.

7. The rapid-deflate valve cover assembly of claim 1, wherein the annular body has an externally threaded portion at the proximal end configured to receive a dust cap to enclose the central passage at the proximal end.

8. The rapid-deflate valve cover assembly of claim 1, wherein the valve core is a valve core of a Schrader valve assembly.

9. The rapid-deflate valve cover assembly of claim 1, wherein the valve stem is a valve stem of a Schrader valve assembly.

10. The rapid-deflate valve cover assembly of claim 1, wherein an area of the pressure relief opening is from five to eight times larger than an area of a flow path of a Schrader valve assembly.

11. A rapid-deflate valve cover configured to operably couple to a Schrader valve stem, the rapid-deflate valve cover comprising:
   an annular body defining a central axis and having a proximal end and a distal end, the annular body including:
      a central passage extending through the annular body along the central axis from the proximal end to the distal end;
      a seal positioned within the central passage;
      an exhaust bore proximal to the distal end of the annular body;
      an internally threaded portion positioned within the central passage between the seal and the exhaust bore, the internally threaded portion configured to threadingly engage an externally threaded portion of the Schrader valve stem;
      a pressure relief gap including a longitudinal trough formed in a direction of the central axis along the internally threaded portion; and
      a valve core chamber at the proximal end configured to operably receive a valve core within the valve core chamber,
   wherein:
      when the rapid-deflate valve cover is in a closed position, the seal contacts the Schrader valve stem to prohibit gas flow from the Schrader valve stem into the central passage and out of the pressure relief gap, and
      when the rapid-deflate valve cover is in an open position with the internally threaded portion partially threadingly engaged with the externally threaded portion of the Schrader valve stem, the seal is positioned away from the Schrader valve stem to permit gas flow from the Schrader valve stem through the pressure relief gap, and a portion of the exhaust bore extends past the externally threaded portion in a direction along the central axis toward the distal end.

12. The rapid-deflate valve cover of claim 11, wherein the exhaust bore has a bore diameter greater than an external diameter of a portion of the Schrader valve stem to form a gas flow path external to the Schrader valve stem and axially out of the distal end of the annular body.

13. The rapid-deflate valve cover of claim 11, wherein the pressure relief gap further includes an orifice extending through the annular body to form a gas flow path radially away from the internally threaded portion.

14. The rapid-deflate valve cover of claim 11, wherein the seal is selected from the group consisting of an o-ring, a washer, and a sealing material.

15. The rapid-deflate valve cover of claim 11, wherein the annular body has an externally threaded portion at the proximal end configured to receive a dust cap to enclose the central passage at the proximal end.

16. The rapid-deflate valve cover of claim 11, wherein an area of the pressure relief gap is from five to eight times larger than an area of a flow path of a Schrader valve assembly.

17. The rapid-deflate valve cover of claim 11, wherein when the valve core is operably received within the valve core chamber and the rapid-deflate valve cover is in the closed position, the valve core is at least partially received within the valve stem.

* * * * *